United States Patent
Lee

(10) Patent No.: US 7,695,147 B2
(45) Date of Patent: Apr. 13, 2010

(54) RETRO-REFLECTION PRODUCT USING WATER BASED RESIN AND FABRICATION METHOD THEREOF

(75) Inventor: In Hwan Lee, Busan (KR)

(73) Assignee: G.B. Light Co., Ltd. (KR)

( * ) Notice: Subject to any disclaimer, the term of this patent is extended or adjusted under 35 U.S.C. 154(b) by 405 days.

(21) Appl. No.: 11/694,506

(22) Filed: Mar. 30, 2007

(65) Prior Publication Data

US 2007/0231512 A1    Oct. 4, 2007

(30) Foreign Application Priority Data

Mar. 31, 2006    (KR) ............... 10-2006-0029535

(51) Int. Cl.
  *G02B 5/126* (2006.01)
(52) U.S. Cl. .............. 359/534; 359/536; 359/900
(58) Field of Classification Search ............... None
  See application file for complete search history.

(56) References Cited

U.S. PATENT DOCUMENTS

| | | | |
|---|---|---|---|
| 5,573,834 A * | 11/1996 | Stahl ............... | 428/195.1 |
| 6,703,108 B1 * | 3/2004 | Bacon et al. ............... | 428/143 |
| 2005/0079324 A1 * | 4/2005 | Haunschild et al. ......... | 428/143 |
| 2006/0046002 A1 * | 3/2006 | Kuo et al. ............... | 428/32.34 |
| 2008/0026193 A1 * | 1/2008 | Koppes et al. ............. | 428/207 |

* cited by examiner

*Primary Examiner*—James Phan
(74) *Attorney, Agent, or Firm*—Park & Associates IP Law LLC

(57) ABSTRACT

Provided are a retro-reflection product using water based resin and a fabrication method thereof. The retro-reflection product includes a glass bead layer attached on a film, an aluminum layer selectively deposited on the glass bead layer according to need, and a base layer for adhering leather, fabric, or urethane sheet. A water based color resin coating layer is primarily coated with water based polyurethane resin over a surface of the glass bead layer. A water based adhesive resin coating layer is secondarily coated with water based polyurethane resin on a surface of the water based color resin coating layer.

5 Claims, 3 Drawing Sheets

RETRO-REFLECTION PRODUCT USING WATER BASED RESIN AND FABRICATION METHOD THEREOF

FIELD OF THE INVENTION

The present invention relates to a retro-reflection product, and more particularly, to a method for fabricating a retro-reflection product using water based resin, which is environment-friendly and harmless to a human body, and a retro-reflection product fabricated by the method.

BACKGROUND OF THE INVENTION

In general, a retro-reflection product is a reflector for returning and reflecting an incident light, which is a reaching light, to a light source when a light emitted from an object (the light source) reaches another object. The retro-reflection product facilitates indication even in a dark place around it by processing a surface of a sheet body by a desired shape or pattern and attaching the processed body to a sign board or clothing by an adhesive or sewing. Therefore, the retro-reflection product enables people around it to surely confirm a position, thereby providing a great effect in worker protection and safety if being attached to clothing for workers working on a road or in a dangerous place such as a street cleaner, a fireman, a policeman, a factory worker, a construction worker, and a safety officer.

The retro-reflection product has been disclosed in Korean Patent No. 10-0349990 entitled "METHOD FOR FABRICATING MULTI COLOR RETRO-REFLECTOR FOR TRANSCRIPT" and Korean Utility Model Registration No. 20-0381037 entitled "RETRO-REFLECTION ARTICLE HAVING WHOLE-SURFACE TRANSPARENT PROTECTION FILM". A method for fabricating the retro-reflection product has been in detail disclosed in Korean Patent Laid-Open No. 2000-0024397 published on May 6, 2000 and entitled "METHOD FOR FABRICATING PATTERN RETRO-REFLECTION PRODUCT WITH DOUBLE EFFECT".

However, when a glass bead layer attached to a PET film or a PE film is processed by primary and secondary coating, the conventional retro-reflection product uses solvent based urethane resin containing a low boiling point solvent such as Methyl Ethyl Ketone (MEK) and Ethyl Acetate (EA) and a high boiling point solvent such as cyclohexanone and DiMethylFormamide (DMF), that is, solvent based polyurethane resin containing polyol, low molecular weight diol, low molecular weight diamine, and isocyanate. In the case of using the solvent based urethane resin, the conventional retro-reflection product not only generates harmful materials to a human body because of toxicity of itself and increases a fire dangerousness but also involves a great dangerousness against workers' health.

In detail, the solvent not only exerts a bad influence upon worker's health and safety and causes lethal environmental pollution but also produces a cancer and causes nausea and skin trouble because of its contained cancer-causing materials and exerts a bad influence upon a human body for long-time use.

In particular, the retro-reflection product processed by the primary and secondary coating using the solvent based polyurethane resin remarkably deteriorates an adhesive strength with the aluminum layer and an adhesive power with the glass bead layer because it is in a state where polyurethane polymer chains are dissolved (unchained) in solvent.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a method for fabricating a retro-reflection product using water based resin, which is environment-friendly and harmless to a human body, instead of solvent based polyurethane resin.

Another aspect of exemplary embodiments of the present invention is to provide a retro-reflection product fabricated using water based resin.

A further another aspect of exemplary embodiments of the present invention is to provide a retro-reflection product for enhancing an adhesive strength with an aluminum layer and an adhesive power with a glass bead layer using water based polyurethane resin for primary and secondary coatings, and a fabrication method thereof.

A still another aspect of exemplary embodiments of the present invention is to provide a method for fabricating a retro-reflection product using water based resin, which is raw materials environment-friendly and harmless to a human body, thereby providing field workers with more comfortable working circumstances.

A yet another aspect of exemplary embodiments of the present invention is to provide a retro-reflection product improving a bonding strength (a ply adhesion) and realizing a rising effect in a physical property, and a fabrication method thereof.

According to one aspect of exemplary embodiments of the present invention, there is provided a retro-reflection product. The retro-reflection product includes a glass bead layer attached on a film, an aluminum layer selectively deposited on the glass bead layer according to need, and a base layer for adhering leather, fabric, or urethane sheet. A water based color resin coating layer is primarily coated with water based polyurethane resin over a surface of the glass bead layer or the aluminum layer deposited on the glass bead layer. A water base adhesive resin coating layer is secondarily coated with water based polyurethane resin on a surface of the water based color resin coating layer.

According to another aspect of exemplary embodiments of the present invention, there is provided a method for fabricating a retro-reflection product using water based resin. The method includes primarily coating a glass bead layer or an aluminum layer deposited on a glass bead layer, with water based polyurethane resin; and secondarily coating the resultant with water based polyurethane resin.

BRIEF DESCRIPTION OF THE DRAWINGS

The accompanying drawings, which are included to aid in The above and other objects, features and advantages of the present invention will become more apparent from the following detailed description when taken in conjunction with the accompanying drawings in which.

DETAILED DESCRIPTION OF THE INVENTION

Exemplary embodiments of the present invention will now be described in detail with reference to the annexed drawings. In the following description, a detailed description of known functions and configurations incorporated herein has been omitted for conciseness.

The present invention is to realize a method for fabricating a retro-reflection product using water based polyurethane resin that is environment-friendly and harmless to a human body instead of solvent-based polyurethane resin that is deadly to a human body and causes an environmental pollution, and a retro-reflection product fabricated by the method.

For this, a method for implementing primary coating and secondary coating (adhesion) on a surface of a glass bead layer or an aluminum layer should be disclosed in detail. Also, a structure and a physical property of a retro-reflection product processed by coating in the method should be disclosed in detail.

An exemplary embodiment of the present invention will be in detail described with the accompanying drawings below.

Figure 1:
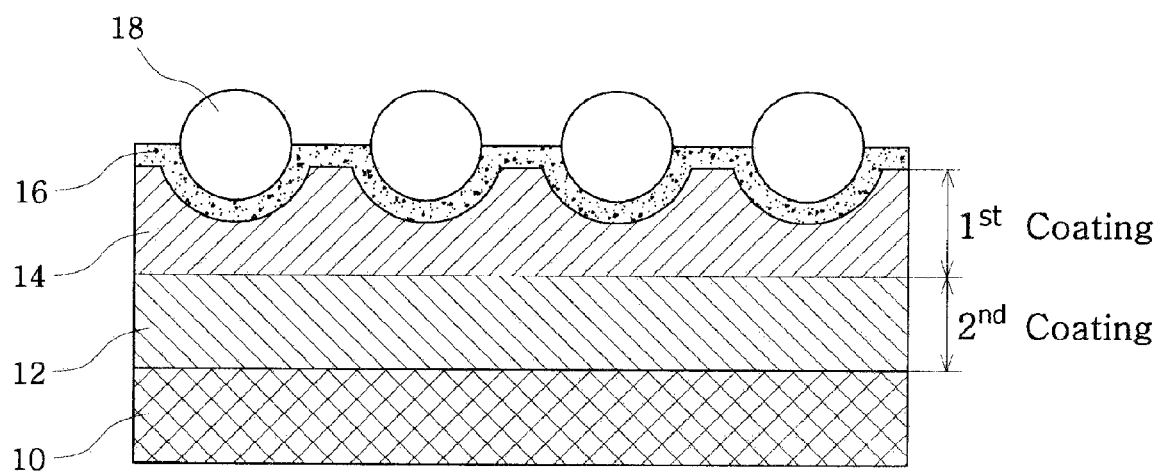
FIG. 1 illustrates a structure of a retro-reflection product fabricated using water based polyurethane resin according to an exemplary embodiment of the present invention.

FIG. 1 illustrates a structure of a retro-reflection product fabricated using water based polyurethane resin according to an exemplary embodiment of the present invention. The inventive retro-reflection product includes a glass bead layer 18, an aluminum layer 16, a water based color resin coating layer 14, a water based adhesive resin coating layer 12, and a base layer 10.

Referring to FIG. 1, the glass bead layer 18 is attached to or coated on a PolyEthylene/PolyEthylene Terephthalate (PE/PET) film. The PE/PET film is used to set the glass bead layer and is removed in a final process. The aluminum layer 16 is deposited on a surface of the glass bead layer 18. The aluminum layer 16 is deposited when a retro-reflection product is fabricated for high luminance. Alternatively, the aluminum layer 16 is not deposited when a retro-reflection product is fabricated for low luminance.

The water based color resin coating layer 14 is primarily coated with water based polyurethane resin on a surface of the aluminum layer 16. The water based polyurethane resin is of a type in which minute urethane particles with a size of about 50 nm to 200 nm are dispersed in water. The water based polyurethane resin is environment-friendly and harmless to a human body. The present invention uses a type in which resin itself has positive ions or negative ions among the water based polyurethane resin.

The water based adhesive resin coating layer 12 is secondarily coated with water based polyurethane resin on a surface of the water based color resin coating layer 14. The base layer 10 is formed on the water based adhesive resin coating layer 12. The base layer 10 is a layer for adhering artificial leather, fabric, natural leather, and thermoplastic polyurethane material.

As described above, the inventive retro-reflection product is coated twice with water based polyurethane resin. A primary and secondary coating method is in detail shown in FIGS. 1 and 2.

Figure 2:
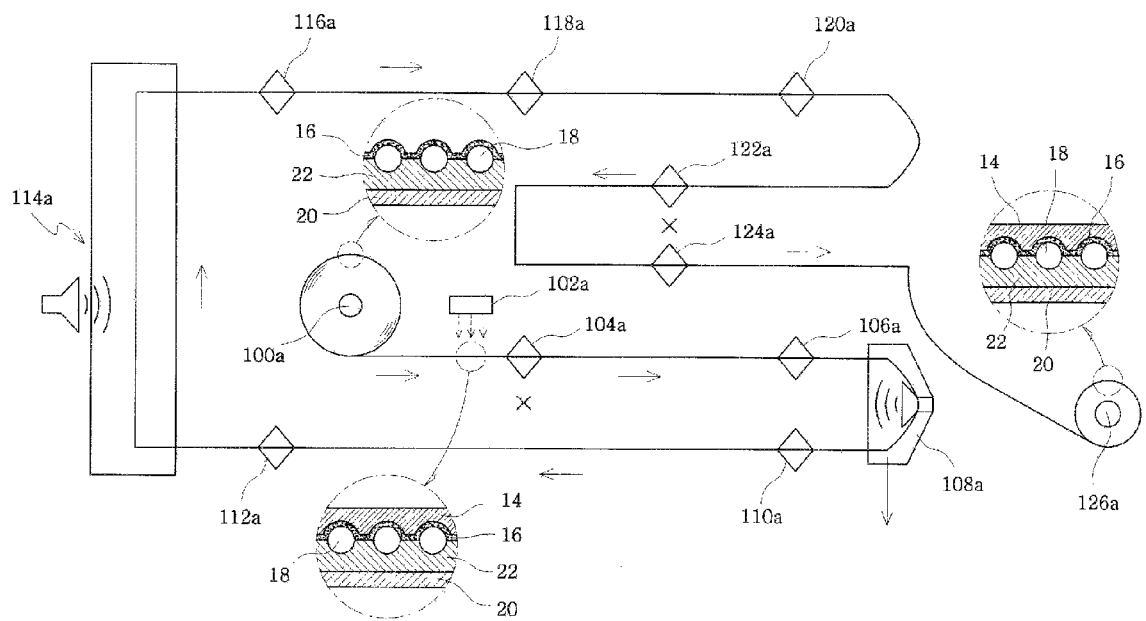
FIG. 2 sequentially illustrates a primary coating process in a method for fabricating the retro-reflection product of FIG. 1.

FIG. 2 sequentially illustrates a primary coating process in a method for fabricating the retro-reflection product of FIG. 1. Referring to FIG. 2, a sheet is rolled around a roll 100a. In detail, the sheet includes a PET film 20, a PE film 22, a glass bead layer 18, and an aluminum layer 16 according to need (depending on whether the retro-reflection product is for high luminance or low luminance) and is rolled around the roll 100a.

The sheet rolled around the roll 100a is unrolled by operation of a roll 126a installed at an opposite side while moving toward a coater 102a. The water based polyurethane resin is coated on a surface of the sheet (e.g., a surface of the aluminum layer 16) by the coater 102a. In other words, the water based color resin coating layer 14 is formed on the surface of the aluminum layer 16 as shown in FIG. 1.

After that, the sheet processed by primary coating (that is, the sheet coated with the water based polyurethane resin) sequentially passes through a chamber 104a, a chamber 106a having 110° C.±10° C., an infrared ray room 108a having 40° C. to 80° C., a chamber 110a having 120° C.±10° C., a chamber 112a having 130° C.±10° C., an infrared ray room 114a having 40° C. to 80° C., a chamber 116a having 140° C.±10° C., a chamber 118a having 140° C.±10° C., a chamber 120a having 140° C.±10° C., a chamber 122a, and a cooling chamber 124a. Next, the sheet is finally rolled around the roll 126a. The infrared ray room 108a is installed between the chambers 106a and 110a and the infrared ray room 114a is installed between the chambers 112a and 116a to prevent a temperature loss during a primary coating work, increase a coating strength when water based resin is coated, and improve a dry condition.

Figure 3:
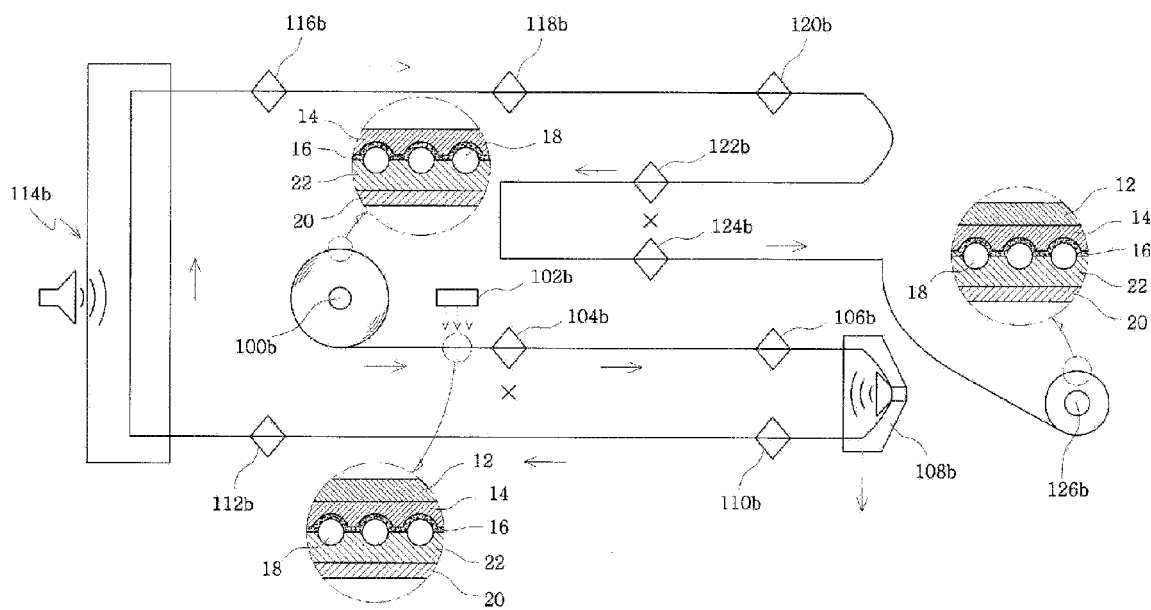
FIG. 3 sequentially illustrates a secondary coating process in a method for fabricating the retro-reflection product of FIG. 1.

FIG. 3 sequentially illustrates a secondary coating process in the method for fabricating the retro-reflection product of FIG. 1.

As shown in FIG. 3, the sheet processed by primary coating as above, desirably, the sheet coated with water based polyurethane resin (that is, the water based color resin coating layer 14) on the surface of the aluminum layer 16 is rolled around a roll 100b. The sheet rolled around the roll 100b is unrolled by a roll 126b installed at an opposite side while being processed by secondary coating.

In detail, the sheet rolled around the roll 100b is unrolled by operation of the roll 126b installed at an opposite side while moving toward a coater 102b. Water based polyurethane resin is coated on the surface of the sheet (that is, the surface of the water based color resin coating layer 14) by the coater 102b. In other words, the water based adhesive resin coating layer 12 is formed on the surface of the water based color resin coating layer 14.

Next, the sheet processed by secondary coating sequentially passes through a chamber 104b, a chamber 106b having 110° C.±10° C., an infrared ray room 108b having 40° C. to 80° C., a chamber 110b having 120° C.±10° C., a chamber 112b having 130° C.±10° C., an infrared ray room 114b having 40° C. to 80° C., a chamber 116b having 140° C.±10° C., a chamber 118b having 140° C.,±10° C., a chamber 120b having 140° C.±10° C., a chamber 122b, and a cooling chamber 124b. Next, the sheet is finally rolled around the roll 126b. The infrared ray room 108b is installed between the chambers 106b and 110b and the infrared ray room 114b is installed between the chambers 112b and 116b to prevent a temperature loss during a secondary coating work, increase a coating strength when water based resin, and improve a dry condition.

In the present invention, a temperature of each chamber was differently set in primary and secondary coating. This was because a supreme retro-reflection product could be obtained at the set temperature as a result of several times of experiment using water based polyurethane resin. Also, the temperature is set to be within a temperature range of "~±10° C." because the retro-reflection product does not have a particular difference in physical property and quality within the temperature range.

A physical property of the retro-reflection product processed by primary and secondary coating as above will be described as in Table 1.

TABLE 1

| Test item | Inventive retro-reflection product | Conventional retro-reflection product |
| --- | --- | --- |
| Taber abrasion | 160 cycles fail | 120 cycles fail |
| Bally flex | 50,000+ | 50,000+ |
| Washing test (5 hrs) | Good | Good |
| Retro-reflection | Average 500 cd/m$^2$ | Average 500 cd/m$^2$ |
| UV test | 5.0 | 5.0 |
| Color migration test | 5.0 | 5.0 |
| High-frequency cutting test | Excellent | Excellent |

Note:
0.4 mm Thermoplastic PolyUrethane (TPU) is used for the test as backing material.

As described above, the present invention has an advantage that the retro-reflection product is fabricated using water based resin, thereby improving worker's work conditions by the complete environment-friendly product not containing a solvent component. In addition, the present invention has an advantage that the retro-reflection product does not generate toxic materials harmful to the human body because of the nature of water based resin, and greatly reduces a fire dangerousness because it does not use a low boiling point solvent.

Also, the present invention has an advantage that because the water based resin is of an ion structure serving as an emulsifying agent compared with the conventional solvent based polyurethane resin, the retro-reflection product can have a strong polar bond with a glass surface, thereby improving an adhesive power or an adhesive strength with the glass bead layer or the aluminum layer. In other words, the retro-reflection product has an excellent adhesive power with the surface of the glass bead layer owing to the polar bond as well as water based resin component.

Also, the present invention has an advantage that a strong affinity between the aluminum layer and the water based polyurethane resin having an ionic property results in an increase of a coating strength in the primary and secondary coating and a reduction of Taber abrasion and Bally flex in the retro-reflection product.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A retro-reflection product comprising:
    a glass bead layer attached on a film;
    an aluminum layer selectively deposited on the glass bead layer according to need; and
    a base layer for adhering leather, fabric, or urethane sheet,
    wherein a water based color resin coating layer is primarily coated with water based polyurethane resin over a surface of the glass bead layer or the aluminum layer deposited on the glass bead layer, and
    wherein a water based adhesive resin coating layer is secondarily coated with water based polyurethane resin on a surface of the water based color resin coating layer.

2. A method for fabricating a retro-reflection product using water based resin, the method comprising:
    primarily coating a glass bead layer or an aluminum layer deposited on a glass bead layer, with water based polyurethane resin; and
    secondarily coating the resultant with water based polyurethane resin.

3. The method of claim 2, wherein when the primary and secondary coating are performed, the resultant is irradiated with infrared rays to prevent a temperature loss.

4. The method of claim 2, wherein when the primary and secondary coating are performed, the resultant is dried while passing through a chamber having a temperature range of 110° C.±10° C. to 140° C.±10° C.

5. A retro-reflection product comprising:
    a glass bead layer attached on a film;
    an aluminum layer deposited on the glass bead layer; and
    a base layer for adhering leather, fabric, or urethane sheet,
    wherein a water based color resin coating layer is primarily coated with water based polyurethane resin over a surface of the aluminum layer, and
    wherein a water based adhesive resin coating layer is secondarily coated with water based polyurethane resin on a surface of the water based color resin coating layer.

* * * * *